United States Patent
Yoo et al.

(10) Patent No.: US 6,654,091 B2
(45) Date of Patent: Nov. 25, 2003

(54) LIQUID CRYSTAL DISPLAY DEVICE AND ITS FABRICATING METHOD IN WHICH THE CONTACT HOLE EXPOSES GATE INSULATING LAYER

(75) Inventors: Soon-Sung Yoo, Kumi-shi (KR); Kyo-Ho Moon, Taegu (KR)

(73) Assignee: LG. Philips LCD Co., Ltd, Seoul (KR)

( * ) Notice: Subject to any disclaimer, the term of this patent is extended or adjusted under 35 U.S.C. 154(b) by 0 days.

(21) Appl. No.: 10/246,673

(22) Filed: Sep. 19, 2002

(65) Prior Publication Data

US 2003/0043308 A1 Mar. 6, 2003

Related U.S. Application Data

(62) Division of application No. 09/784,087, filed on Feb. 16, 2001.

(30) Foreign Application Priority Data

Feb. 19, 2000 (KR) .......................................... 2000-8042

(51) Int. Cl.⁷ .......................... G02F 1/1343; H01L 21/00
(52) U.S. Cl. ........................ 349/139; 349/138; 349/147; 438/30
(58) Field of Search ................................ 349/139, 138, 349/147, 113, 47; 438/30

(56) References Cited

U.S. PATENT DOCUMENTS

| | | | | |
|---|---|---|---|---|
| 5,784,131 A | * | 7/1998 | Kim et al. ...................... | 349/39 |
| 5,920,083 A | * | 7/1999 | Bae ................................ | 257/59 |
| 6,078,366 A | * | 6/2000 | Dohjo et al. ................... | 349/43 |
| 6,163,356 A | * | 12/2000 | Song et al. ................... | 349/152 |
| 6,188,461 B1 | * | 2/2001 | Moon .......................... | 349/187 |
| 6,190,934 B1 | * | 2/2001 | Kang et al. ................... | 438/30 |
| 6,300,152 B1 | * | 10/2001 | Kim ............................. | 438/30 |
| 6,310,669 B1 | * | 10/2001 | Kobayashi et al. ........... | 349/43 |
| 6,344,884 B1 | * | 2/2002 | Kim et al. .................... | 349/43 |
| 6,424,399 B1 | * | 7/2002 | Shimada et al. ............. | 349/147 |

* cited by examiner

*Primary Examiner*—Robert H. Kim
*Assistant Examiner*—Mike Qi
(74) *Attorney, Agent, or Firm*—McKenna Long & Aldridge

(57) ABSTRACT

A liquid crystal display device, and a method of fabricating that device, including a substrate with a thin film transistor having gate, source, and drain electrodes. A pixel electrode electrically connects to the drain electrode, and a data line electrically connects to the source electrode. A first insulating layer, a pure amorphous silicon layer, and a doped amorphous silicon layer are sequentially layered under the data line. A data pad is formed at one end of the data line. A gate line electrically connects to the gate electrode. A gate pad electrode at one end of the gate line is formed through the first insulating layer and connects to the gate line.

15 Claims, 9 Drawing Sheets

LIQUID CRYSTAL DISPLAY DEVICE AND ITS FABRICATING METHOD IN WHICH THE CONTACT HOLE EXPOSES GATE INSULATING LAYER

This application is a divisional of U.S. patent application Ser. No. 09/784,087 filed Feb. 16, 2001.

This application claims the benefit of Korean Patent Application No. 2000-8042, filed on Feb. 19, 2000, which is hereby incorporated by reference.

BACKGROUND OF THE INVENTION

1. Field of the Invention

The present invention relates to a liquid crystal display (LCD) device, and more particularly, to an active matrix LCD (AM-LCD) device having thin film transistors (TFTs).

2. Discussion of the Related Art

Because liquid crystal display (LCD) devices are light, thin, and consume low power they are widely used in office automation equipment and video devices. LCDs are based on the optical anisotropy of a liquid crystal (LC). A LC has long, thin molecules whose orientational alignment can be controlled by an applied electric field. When the alignment of the LC molecules is correct, an applied light is refracted along the alignment direction of the LC molecules such that an image is displayed.

Active matrix (AM) LCDs, in which thin film transistors (TFTs) and pixel electrodes are arranged in an array matrix, are typically used because of their high resolution and superiority in displaying moving images. In an AM LCD each TFT serves as a switch for a corresponding pixel. A switched on pixel transmits incident light. Since amorphous silicon is relatively easy to form on large, relatively inexpensive, glass substrates, amorphous silicon thin film transistors (a-Si:H TFT) are widely used.

FIG. 1 is a cross-sectional view illustrating a conventional LCD panel 20. As shown, the LCD panel has lower and upper substrates 2 and 4, and an interposed liquid crystal layer 10. The lower substrate 2 includes a substrate 1, a TFT "S" as a switching element to selectively change the orientation of the liquid crystal molecules, and a pixel electrode 14 for the application of a voltage that produces an electric field across the liquid crystal layer 10 in accordance with signals from the TFT "S". The upper substrate 4 has a color filter 8 for implementing color. A common electrode 12 is formed on the color filter 8. The common electrode 12 serves as the other electrode for producing the electric field across the liquid crystal layer 10. The pixel electrode 14 is arranged over a pixel portion "P", i.e., a display area. Further, to prevent leakage of the liquid crystal layer 10 between the substrates 2 and 4, the substrates 2 and 4 are sealed by a sealant 6. The nematic, smectic, and cholesteric liquid crystals are most widely used in the above-mentioned LCD panel.

FIG. 2 is a plan view illustrating the lower substrate 2 of the typical LCD device shown in FIG. 1. As shown, on a substrate (reference 1 of Figure), a gate line 22 is arranged in a transverse direction, and a data line 24 is arranged perpendicular to the gate line 22. The TFT "S" is arranged at a crossing point of the gate and data lines 22 and 24. The pixel electrode 14 is arranged on a pixel region (reference "P" of FIG. 1) defined by the gate and data lines 22 and 24. The TFT "S" includes a gate electrode 26, a source electrode 28 and a drain electrode 30. The gate electrode 26 electrically connects with the gate line 22, and the source electrode 28 electrically connects with the data line 24. The drain electrode 30 electrically connects with the pixel electrode 14 through a drain contact hole 32.

Still referring to FIG. 2, gate and data pads 21 and 23 are integrally formed as terminal portions of the gate and data lines 22 and 24, respectively. Over the gate and data pads 21 and 23 are a gate pad electrode 34 and a data pad electrode 36. The gate and data pads 21 and 23 are electrically connected with the gate pad electrode 34 and the data pad electrode 36 via a gate pad contact hole 44 and a data pad contact hole 42, respectively. The gate pad electrode 34 and the data pad electrode 36 are electrically connected with external driving circuits (not shown) that drive the TFT "S" and the pixel electrode 14.

In addition, a storage capacitor "Cst" is formed over a portion of the gate line 22. The storage capacitor "Cst" stores electric charge. When an electric signal is applied to the gate electrode 26 of the TFT "S", a data signal can be applied to the pixel electrode 14. Thus, unless the electric signal is applied to the gate electrode 26, a data signal cannot be applied to the pixel electrode 14.

A process for manufacturing the array substrate 2 requires repeated steps of depositing and patterning of various layers. The patterning steps use photolithography masks to control light exposing. As each photolithography step requires a mask, the number of masks required controls the number of patterning steps. As the number of masks decreases, the fabricating process becomes simpler and fewer errors tend to occur.

The fabricating process for the array substrate is determined by the design specifications for the array substrate and the materials used for the various layers. For example, when fabricating a large (say above about 12 inches) LCD device, the resistance of the gate line material can be a critical factor in determining the quality of the LCD device. Therefore, a highly conductive metal, such as aluminum (AL) or an aluminum alloy, is usually used for the gate lines of large LCD devices.

The general manufacturing process for the lower substrate 2 will be explained with reference to FIGS. 3A to 3E. In practice, an inverted staggered type TFT is widely employed due to its advantages of simplicity and high quality. The inverted staggered type TFT can be classified as either a back-channel-etch type or an etching-stopper type, based on the method of forming a channel. As the back-channel-etch type has a simpler structure, FIGS. 3A to 3E show a manufacturing process that produces back-channel-etch type TFTs.

FIGS. 3A to 3E are sequential cross sectional views taken along lines "A—A" and "B—B" of FIG. 2. At first, extraneous substances and organic materials are removed from a substrate 1. By cleaning the substrate 1 the adhesion between the substrate 1 and subsequently formed layers is increased. After cleaning, a first metallic material is deposited on the substrate 1 and patterned via photolithography using a first mask to produce a gate electrode 26, a gate line (not shown in FIG. 3A, but reference element 22 of FIG. 2), and a first capacitor electrode 22a. Aluminum (Al) is a widely used first metallic material because it has a low resistance that reduces RC delays. However, pure aluminum often produces hillocks that can cause defects. Therefore, an aluminum alloy (or an aluminum layer that is covered by another metal) is usually used instead of pure aluminum.

Next, as shown in FIG. 3B, a gate insulating layer 50 is deposited on the exposed surface of the substrate 1 such that the gate insulating layer 50 covers the gate line, including the gate electrode 26, and the first capacitor electrode 22a.

Thereafter, a pure amorphous silicon layer (a-Si:H) 52 and a doped amorphous silicon layer (n+a-Si:H) 54 are sequentially deposited on the gate insulating layer 50. The amorphous silicon layer and the doped amorphous silicon layer 52 and 54 are then patterned into an active layer 55 and a semiconductor island 53, using a second mask. The doped amorphous silicon layer 54 reduces the contact resistance between the active layer 55 and a metal layer that will be subsequently formed over the active layer 55. The doped amorphous silicon layer 54 is often called an ohmic contact layer.

Subsequently, as shown in FIG. 3C, a second metallic material is deposited and patterned using a third mask into source and drain electrodes 28 and 30, a data line 24 (also see FIG. 2), and a second capacitor electrode 58. Beneficially, the second metallic material is either chromium (Cr) or a chromium alloy. The second capacitor 58 is formed on the gate insulating layer 50 and overlaps a portion of the first capacitor electrode 22a. This forms the storage capacitor Cst (see FIG. 2).

Thereafter, using the source and drain electrodes 28 and 30 as a mask, a portion of the ohmic contact layer 54 is etched away to form a channel 38 between the source and drain electrodes 28 and 30. However, there is no etching selectivity between the ohmic contact layer 54 and the amorphous silicon layer 52. Therefore, etching the ohmic contact layer should be performed very carefully. In practice, about 50 to 100 nm of the amorphous silicon layer 52 is etched away when forming the channel. The electrical properties of the TFT "S" directly depend on the etching uniformity of the over-etched portion of the amorphous silicon layer 52.

Next, as shown in FIG. 3D, an insulating layer is deposited and patterned using a fourth mask to form a passivation layer 56, which serves to protect the active layer 55. The passivation layer 56 is either an inorganic material such as silicon oxide (SiO$_2$), or an organic material such as benzocyclobutene (BCB). Those materials have high light-transmittance, good humidity resistance, and good reliability, all of which are required. In addition, a data pad contact hole 42, a drain contact hole 32, and a storage contact hole 40 are formed through the passivation layer 56 to expose portions of the second storage electrode 58, the drain electrode 30, and the data pad 23. The drain contact hole 32 and the storage contact hole 40 respectively serve to electrically connect the drain electrode 30 and second storage electrode 58 to a pixel electrode 14 (see FIG. 2 and FIG. 3E). Further, the data pad contact hole 42 serves to electrically connect the data line 24 with a data pad electrode 36 (also see FIG. 2 and FIG. 3E).

Next, as shown in FIG. 3E, a transparent conductive material is deposited on the passivation layer 56. That transparent conductive material is then patterned using a fifth mask to form the pixel electrode 14, the data pad electrode 36, and a gate pad electrode (reference 34 of FIG. 2). Indium tin oxide (ITO) is beneficially used for the pixel electrode 14. As previously mentioned, the pixel electrode 14 electrically contacts the drain electrode 30 and second storage electrode 58 via the drain contact hole 34 and storage contact hole 40, respectively.

The fabricating process for the above-described LCD device uses at least five masks. However, if the gate electrode is made of aluminum at least two additional masks are required to address hillocks on the surface of the aluminum layer. Therefore, the conventional manufacturing process for an array substrate requires five to seven masks. As each mask process requires various steps, such as cleaning, depositing, baking, and etching, a reduction of one mask significantly reduces production costs and improves manufacturing yield.

For the foregoing reasons, a four-mask process for fabricating LCD devices has been developed. In the conventional four-mask process the active layer 55 of FIG. 3B is not patterned by itself. Instead, the source and drain electrode 28 and 30 are formed on the doped amorphous silicon layer 54. Then the various layers are patterned together. With reference to FIG. 4, the conventional four-mask will now be explained.

FIG. 4 is a cross-sectional view taken along a line "IV—IV" of FIG. 2. As shown, a gate pad 21 electrically contacts a gate pad electrode 34. First, a gate pad 21 is formed on the substrate 1. Then, a gate insulating layer 50, an amorphous silicon layer 57, and a passivation layer 56 are sequentially formed over the substrate 1. When the drain contact hole (reference 32 of FIGS. 2 and 3D) is patterned through the passivation layer 56, a gate pad contact hole 44 is formed through the gate insulating layer 50, the amorphous silicon layer 57, and the passivation layer 56. Therefore, a portion of the gate pad 21 is exposed by the gate pad contact hole 44. When a gate pad electrode 34 is formed over the gate pad 21, they are electrically connected to each other via the data pad contact hole 42.

The gate pad electrode 34 is comprised of the same material, a transparent conductive material, as the pixel electrode 14 (see FIG. 3E). Unfortunately, the transparent conductive material, usually indium tin oxide (ITO), has poor step coverage. Therefore, if the transparent conductive material is formed along a large step, such as at the gate pad contact hole 44, the transparent conductive material is easily broken. Because the amorphous silicon layer 57 was not patterned in a previous step, the step at the gate pad contact hole is particularly large. Thus, open line defects 60 tend to occur along the gate pad electrode 34. Such open line defects 60 cause abnormal operation of the LCD device.

SUMMARY OF THE INVENTION

Accordingly, the present invention is directed to a reflective LCD device that substantially obviates one or more of the problems due to limitations and disadvantages of the related art.

An object of the present invention is to provide an improved four mask fabrication process for liquid crystal display devices.

To achieve the above object, the principles of the present invention provide for a novel liquid crystal display device. That device includes a substrate with a thin film transistor having a gate electrode, a source electrode, and a drain electrode. A pixel electrode electrically connects with the drain electrode, and a data line electrically connects with the source electrode. A first insulating layer, a pure amorphous silicon layer, and a doped amorphous silicon layer are sequentially layered under the data line. A data pad is at one end of the data line. A gate line electrically connects to the gate electrode of the thin film transistor and to a gate pad electrode at one end of the gate line. The gate pad electrode is formed on the first insulating layer and in a hole through the first insulating layer that exposes a portion of the gate line. Thus, the gate pad electrode electrically contacts the exposed portion of the gate line.

The pixel electrode is beneficially selected from a group consisting of indium tin oxide (ITO) and indium zinc oxide (IZO).

The drain electrode is electrically connected to the pixel electrode via a drain hole through the first insulating layer such that the pixel electrode electrically contacts an inner side surface of the drain electrode.

A data pad contact hole passes through the doped amorphous silicon layer and through the amorphous silicon layer. The same material that comprises the pixel electrode electrically contacts an inner side surface of the data pad via the data pad contact hole.

In another aspect, the present invention provides a method of fabricating a liquid crystal display device. The method includes preparing a substrate and then forming a gate electrode on the substrate by depositing and patterning a first metal layer. Next, a gate insulating layer is formed on the gate electrode, followed by the formation of a silicon layer on the gate insulating layer. Next, a data line, a source electrode, a drain electrode, and a data pad are formed by depositing and patterning a second metal layer on the silicon layer. Next, forming a passivation layer on the data line, the source electrode, and drain electrode such that the passivation layer exposes portions of the data pad and the drain electrode. The method continues by forming a data pad contact hole and a drain contact hole, respectively, on the exposed portions of the data pad and drain electrode such that portions of the gate insulating layer are exposed. Next, forming a pixel electrode and a data pad electrode by depositing and patterning a transparent conductive material on the passivation layer such that the pixel electrode and the data pad electrode electrically contact the drain electrode and data pad, respectively.

The data pad electrode beneficially contacts an inner side surface of the data pad via the data pad contact hole. The pixel electrode beneficially contacts an inner side surface of the drain electrode via the drain contact hole.

It is to be understood that both the foregoing general description and the following detailed description are exemplary and explanatory and are intended to provide a further explanation of the invention as claimed.

BRIEF DESCRIPTION OF THE DRAWING

The accompanying drawings, which are included to provide a further understanding of the invention and are incorporated in and constitute a part of this specification, illustrate an embodiment of the invention and together with the description serve to explain the principles of the invention.

In the drawings.

DETAILED DESCRIPTION OF THE ILLUSTRATED EMBODIMENT

Reference will now be made in detail to the illustrated embodiment of the present invention, an example of which is shown in the accompanying drawings.

Figure 1:
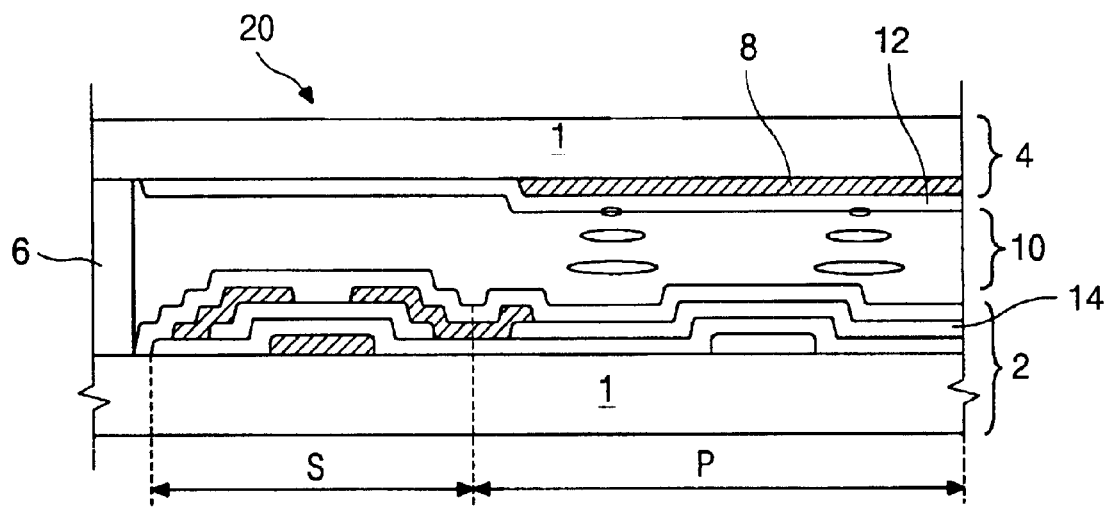
FIG. 1 is a cross-sectional view illustrating a liquid crystal display device according to the related art.
Figure 2:
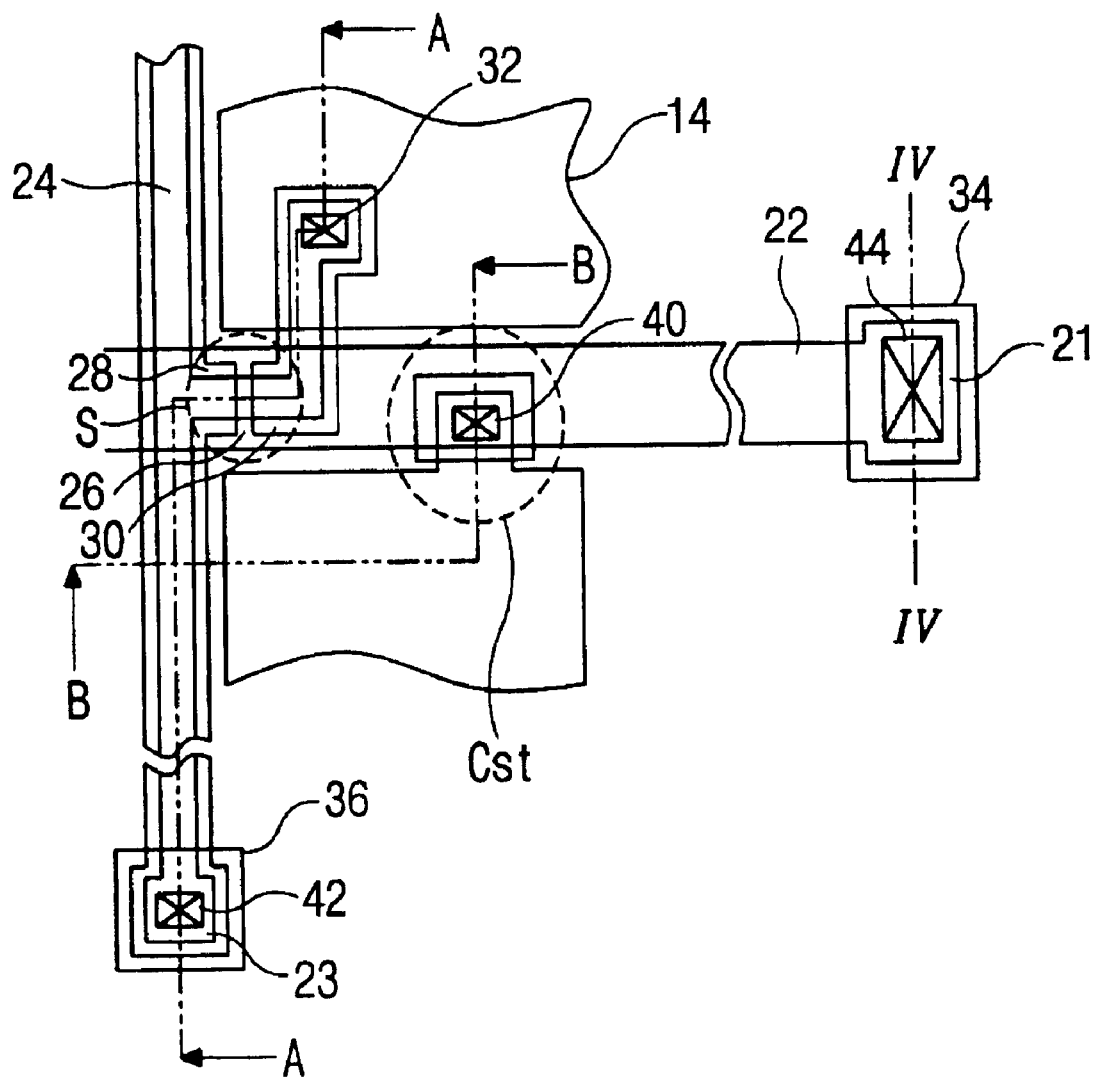
FIG. 2 is a plan view of the LCD device according to the related art.
Figure 3A:
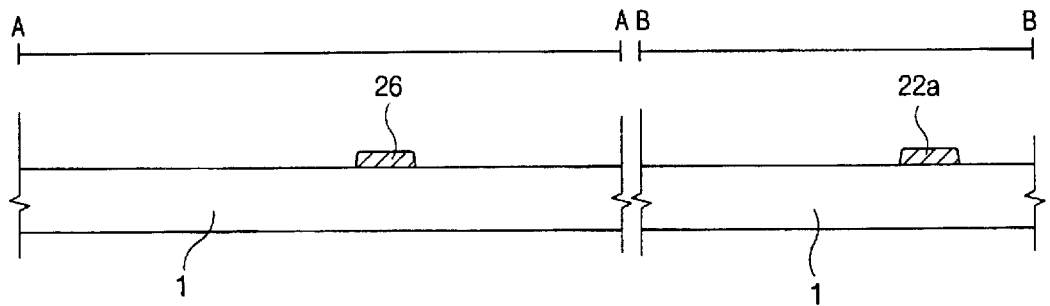
FIGS. 3A to 3E are sequential cross-sectional views illustrating a five mask fabricating process for LCD devices according to the related art.
Figure 3B:
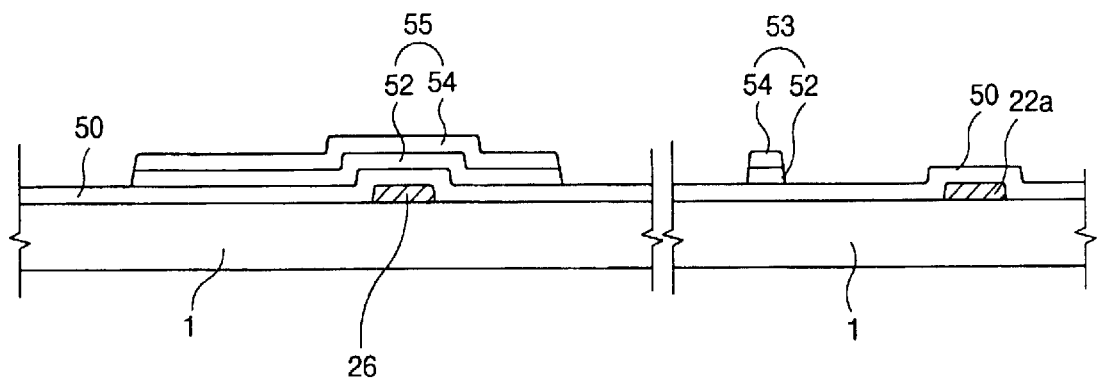
Figure 3C:
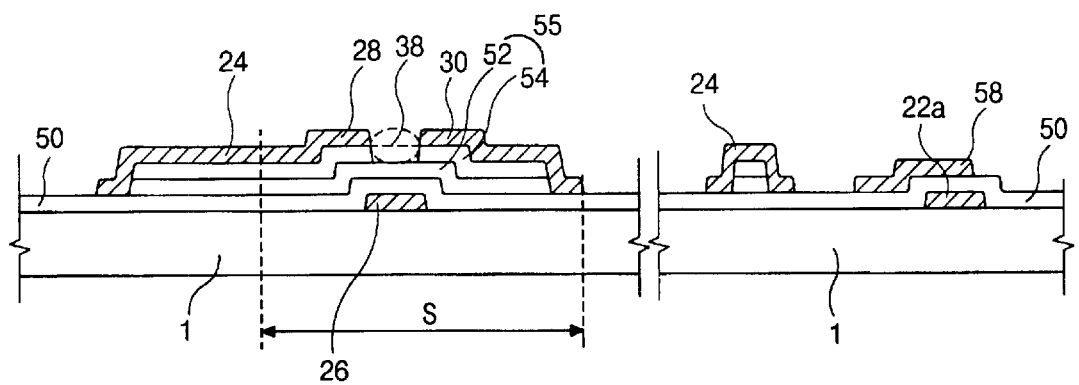
Figure 3D:
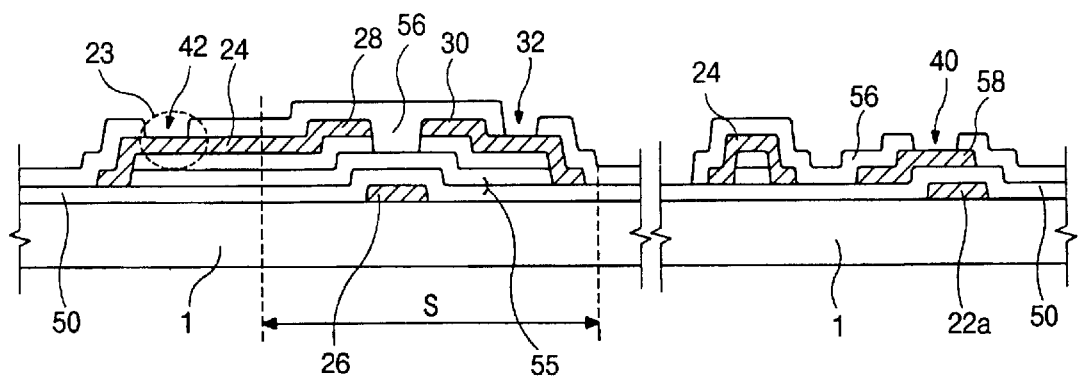
Figure 3E:
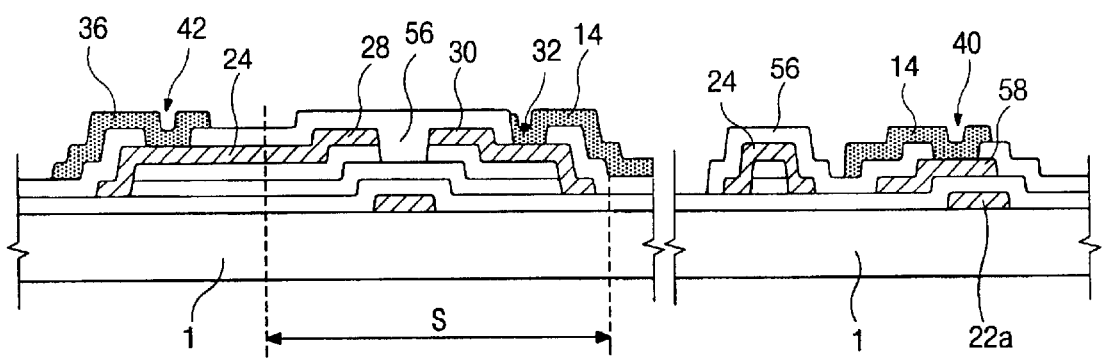
Figure 5:
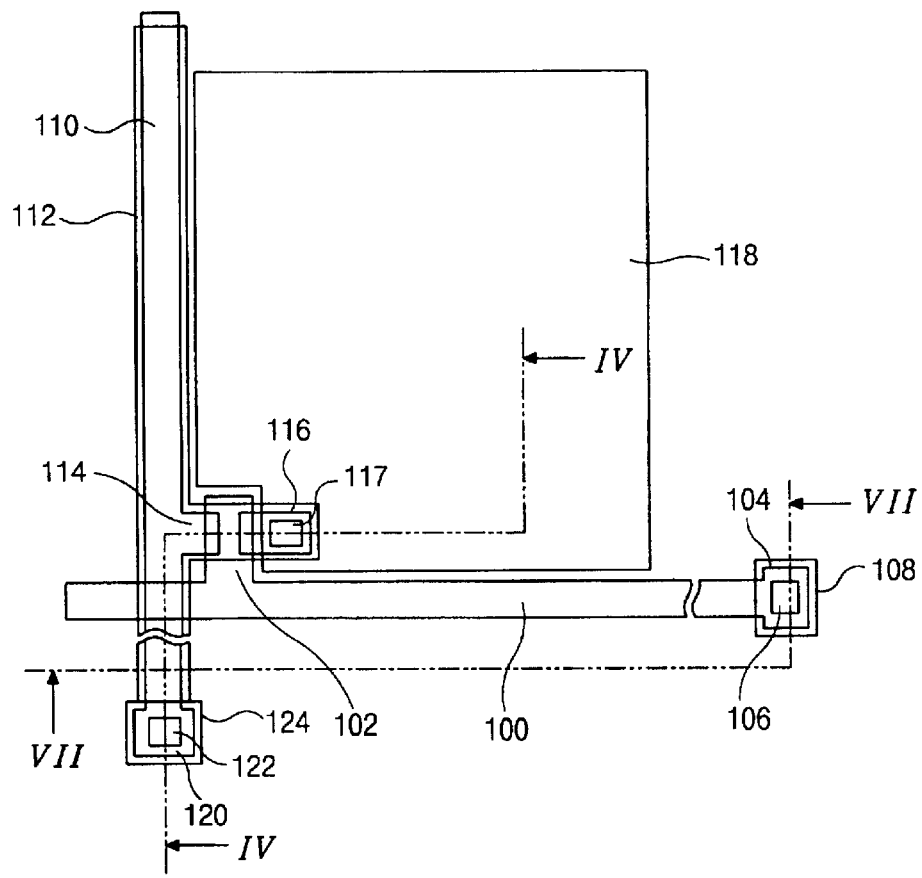
FIG. 5 is a plan view of an LCD device according to a preferred embodiment of the present invention.

As shown in FIG. 5, a gate line 100 is transversely formed on a substrate (reference 90 of FIG. 6A), and a data line 110 is arranged perpendicular to the gate line 100. On a pixel region (reference "P" of FIG. 1) defined by the gate and data lines 100 and 110, is a pixel electrode 118. At the crossing of the gate and data lines 100 and 110 is a gate electrode 102 that extends from the gate line 100. At one end of the gate line 100 is a gate pad 104. A gate pad electrode 108 is formed over the gate pad 104. The gate pad 104 electrically connects to the gate pad electrode 108 via a gate pad contact hole 106 formed through the gate pad 104.

A source electrode 114 extends from the data line 110 such that the source electrode overlaps the gate electrode 102. A data pad 120 is formed at one end of the data line 110. A data pad electrode 124 is formed over the data pad 120. The data pad electrode 124 and the data pad 120 are electrically connected together via a data pad contact hole 122. The data pad contact hole 122 preferably includes a plurality of holes formed through the data pad 120 such that the contact resistance between the data pad 120 and the data pad electrode 124 is reduced. Furthermore, the data pad electrode 124 contacts an inner side surface of the data pad 120, or an inner side surface of the data pad contact hole 122 is formed through the data pad 120. This side surface contact will be explained in more detail subsequently.

Still referring to FIG. 5, a drain electrode 116 is formed opposite the source electrode 114. A drain contact hole 117 is formed through the drain electrode 116. The drain electrode 116 electrically contacts the pixel electrode 118 via the drain contact hole 117. Like the contact between the data pad and the data pad electrode 120 and 124, the pixel electrode 118 electrically contacts an inner side surface of the drain electrode 116, or an inner side surface of the drain contact hole 117. A more detailed explanation about the side surface contacts is provided below.

Figure 6A:
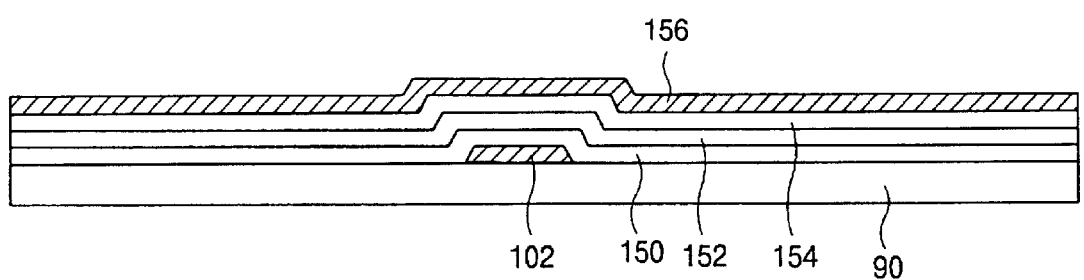
FIGS. 6A to 6D are sequential cross-sectional views taken along a line "VI—VI" of FIG. 5.

With reference to FIGS. 6A to 6D, a fabricating process for the inventive LCD device will now be provided. As shown in FIG. 6A, a first metal layer is deposited and patterned on the substrate 90 using a first mask to form the gate line (reference element 100 of FIG. 5), the gate electrode 102, and the gate pad (reference element 104 of FIG. 5). A gate insulating layer 150 is subsequently formed over the gate line, gate electrode, gate pad, and substrate 90. Thereafter, a pure amorphous silicon layer 152, a doped amorphous silicon layer 154, and a second metal layer 156 are sequentially formed on the gate insulating layer 150. The second metal layer 156 is preferably molybdenum (Mo) or the like that can be etched using a dry etch method.

Figure 6B:
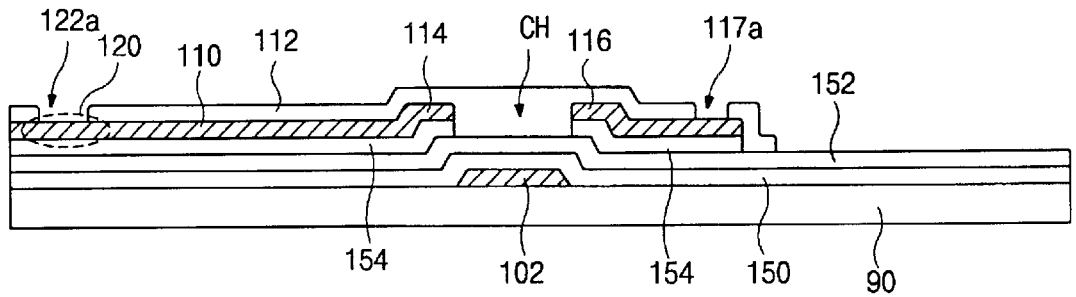

Next, as shown in FIG. 6B, the second metal layer 156 is etched using a second mask to form the source and drain electrodes 114 and 116, data line 110, and data pad 120. Using the source and drain electrodes 114 and 116 as a mask, the doped amorphous silicon layer 154 is subsequently etched to form a channel "CH" between the source and drain electrodes 114 and 116. Thereafter, a passivation layer 112 is deposited and patterned using a third mask to cover the source electrode 114, drain electrode 116, and data line 110. The passivation layer 112 is also patterned to have first and second through holes 117a and 122a, which respectively expose portions of the drain electrode 116 and data pad 120.

Figure 6C:
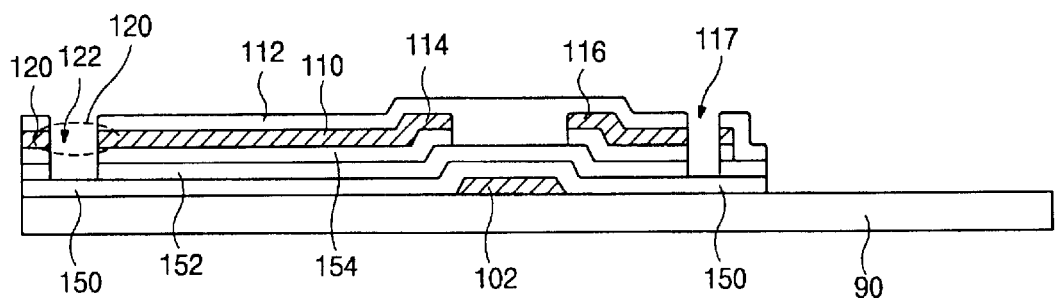

Next, as shown in FIG. 6C, using the passivation layer 112 as a mask, the exposed doped amorphous silicon layer 154 is etched away. The exposed portions of the drain electrode 116 and data pad 120 are also etched away such that the drain contact hole 117 and the data pad contact hole 122 are formed. Since the drain electrode 116 and the data pad 120 are comprised of a metal that can be dry-etched it is possible to etch both the metal and the doped amorphous silicon layer 152 together. The drain contact hole 117 and the data pad contact hole 122 expose inner side portions of the drain electrode 116 and the data pad 120, and planar portions of the gate insulating layer 150.

Figure 6D:
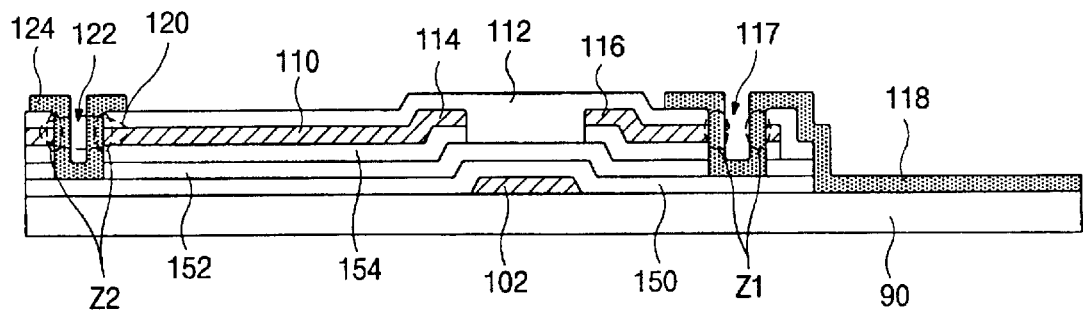

Next, as shown in FIG. 6D, a transparent conductive material is deposited on the passivation layer 112 and then patterned using a fourth mask such that the pixel electrode 118, the data pad electrode 124, and the gate pad electrode (reference 108 of FIG. 5) are formed. The transparent conductive material is preferably selected from a group consisting of indium tin oxide (ITO) and indium zinc oxide (IZO). The pixel electrode 118 and the data pad electrode 122 are formed so as to contact the inner surfaces of the drain contact hole 117 and data pad contact hole 122, respectively. Therefore, the pixel electrode 118 and the data pad electrode 124 electrically contact the inner side surfaces "Z1" and "Z2" of the drain electrode 116 and the data pad 120, respectively.

Figure 7A:
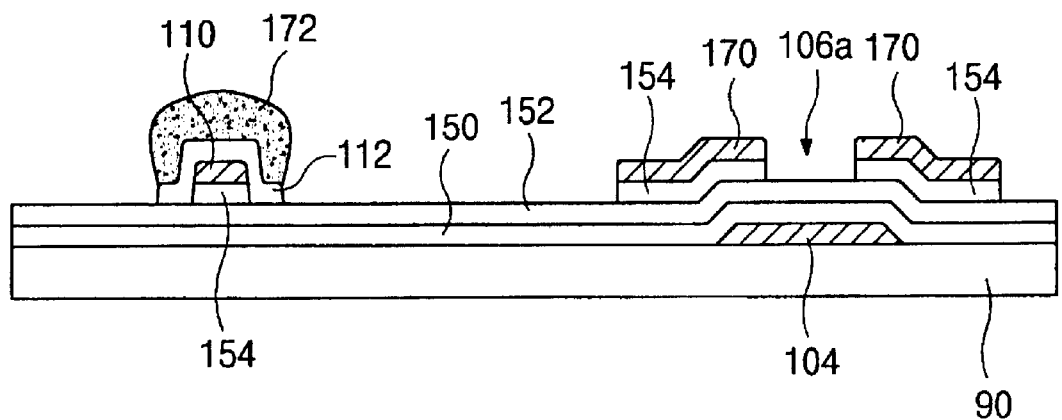
FIGS. 7A to 7E are cross-sectional views taken along a line "VII—VII" of FIG. 5.
Figure 7B:
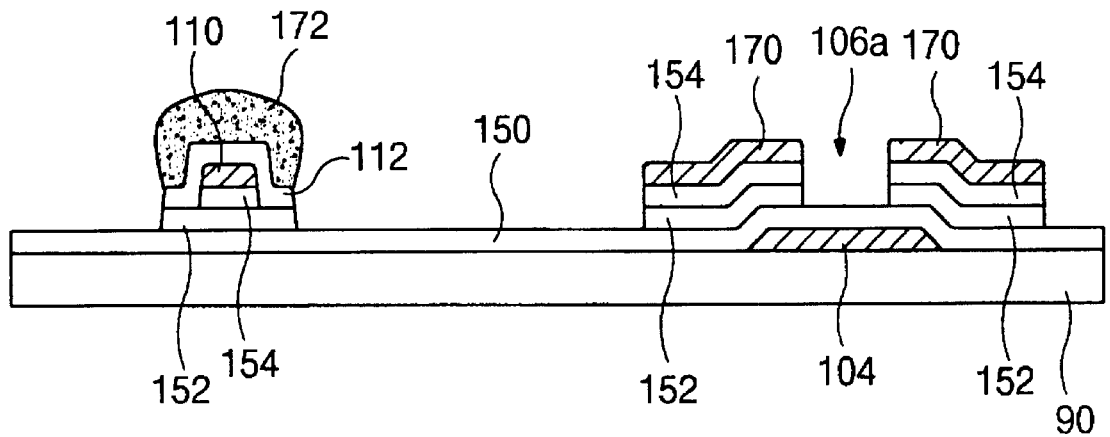
Figure 7C:
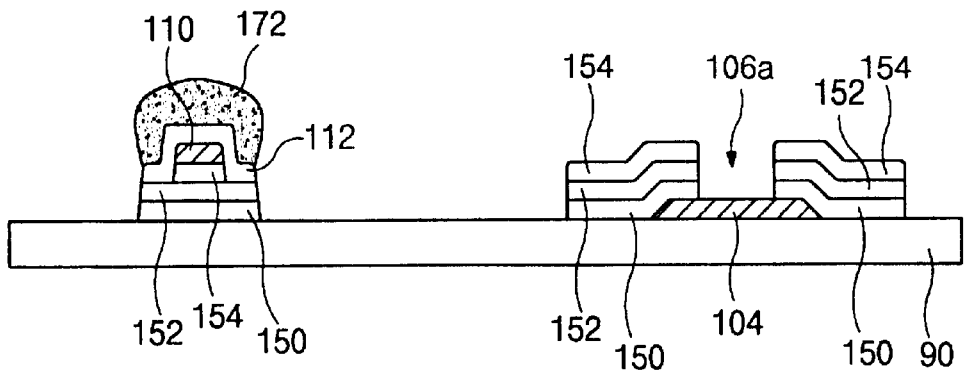

Now, with reference to FIGS. 7A to 7C, the structure of the gate pad contact hole according to the preferred embodiment is explained.

FIGS. 7A to 7C are cross-sectional views taken along line "VII—VII" of FIG. 5 during the fabrication process. As shown in FIG. 7A, just after the patterning of the passivation layer 112 explained with the assistance of FIG. 6B, a photoresist pattern 172 is on the passivation layer 112 covering the data line 110. The photoresist pattern 172 was formed using the third mask, which was used to pattern the passivation layer 112. The passivation layer 112 was patterned using the photoresist pattern 172 such that the passivation layer was etched away, except for the passivation layer under the photoresist pattern 172. The first and second through holes (reference 117a and 122a, see FIG. 6C) have been formed through the passivation layer 112.

An auxiliary metal pattern 170 is present over the gate pad 104, and a third through hole 106a that corresponds to the position of the gate pad 104 is formed through the auxiliary metal pattern 170. The auxiliary metal pattern 170 is formed from the same material as, and along with, the data line 110. The auxiliary metal pattern 170 serves as an etching stopper, which will be explained later.

Next, as shown in FIG. 7B, the pure amorphous silicon layer 152 is etched away, except for under the auxiliary metal pattern 170, under the passivation layer 112, and under the photoresist 172. That is to say, the auxiliary metal pattern 170, passivation layer 112, and photoresist 172 act as a mask. Thereafter, as shown in FIG. 7C, the auxiliary metal layer 170 and portions of the gate insulating layer 150 are etched away such that the gate pad contact hole 106 is fully formed, thus exposing the gate pad 104, and such that the doped amorphous silicon layer 154 is exposed.

Figure 4:
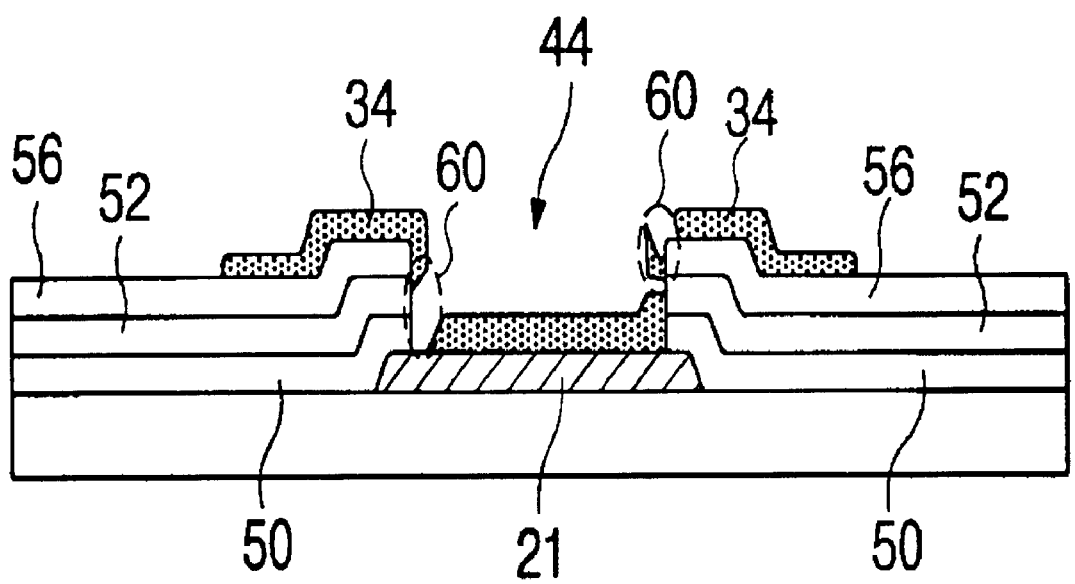
FIG. 4 is a cross-sectional view taken along a line "UV-IV" of FIG. 2, wherein a conventional fabricating process using four masks is applied to LCD device.
Figure 7D:
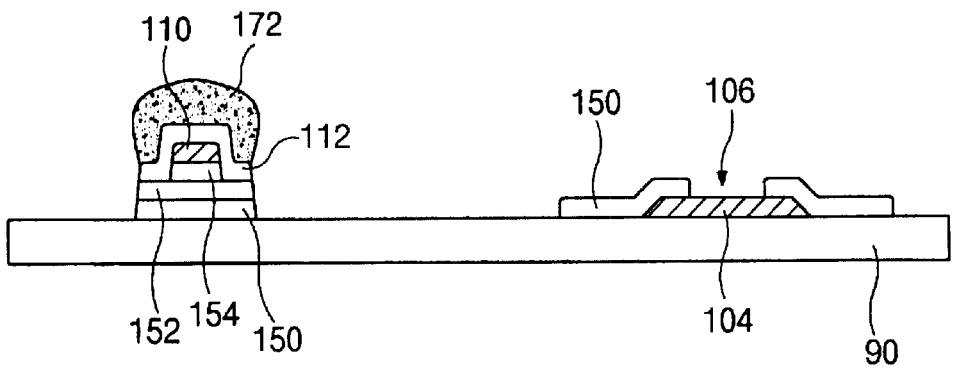
Figure 7E:
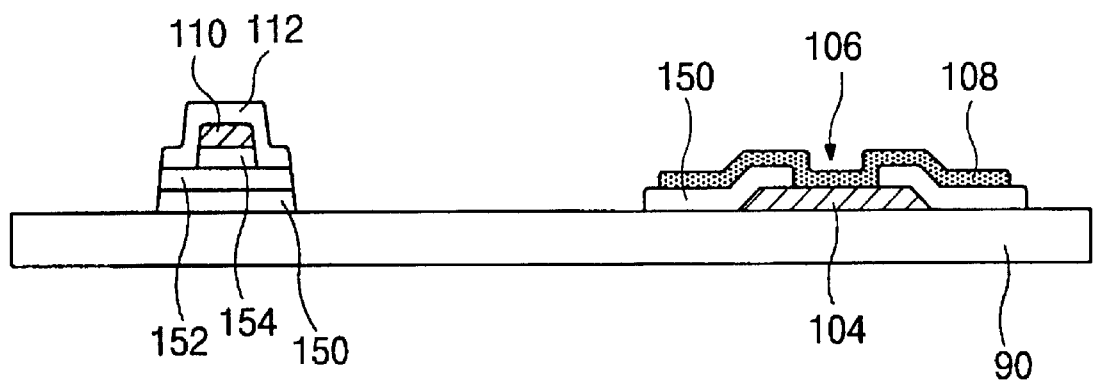

Next, as shown in FIG. 7D, the silicon layers 154 and 152 are etched away to expose the gate insulating layer 150 around the gate pad 104. Then, as shown in FIG. 7E, the gate pad electrode 108 is formed over the gate pad 104 such that the gate pad electrode 108 electrically contacts the gate pad 104 via the gate pad contact hole 106. Compared with a conventional gate pad contact hole shown in FIG. 4, the inventive gate pad contact hole 106 has a significantly small step. Therefore, the step coverage of the transparent conductive material, preferably indium tin oxide (ITO) or indium zinc oxide (IZO), is better than with the conventional gate pad contact hole shown in FIG. 4. Accordingly, the number of open line defects as illustrated in FIG. 4 are reduced.

It will be apparent to those skilled in the art that various modifications and variation can be made in the illustrated device and method without departing from the spirit or scope of the invention. Thus, it is intended that the present invention covers the modifications and variations of this invention that come within the scope of the appended claims and their equivalents.

What is claimed is:

1. A method of fabricating a liquid crystal display device, comprising:

preparing a substrate;

forming a gate electrode on the substrate;

forming a gate insulating layer on the gate electrode;

forming a silicon layer on the gate insulating layer;

forming a data line having a source electrode and a data pad, and a drain electrode, on the silicon layer from a metal layer;

forming a passivation layer on the data line, source electrode, and drain electrode such that the passivation layer includes openings that expose portions of the data pad and of the drain electrode;

forming a data pad contact hole through the exposed portion of the data pad, and forming a drain contact hole through the exposed portion of the drain electrode, such that portions of the gate insulating layer are exposed; and forming a pixel electrode and a data pad electrode by depositing and patterning a transparent conductive material on the passivation layer such that the pixel electrode electrically contacts the drain electrode and such that the data pad electrode electrically contacts the data pad.

2. The method of claim 1, wherein the data pad electrode contacts an inner side surface of the data pad via the data pad contact hole.

3. The method of claim 1, wherein the pixel electrode contacts an inner side surface of the drain electrode via the drain contact hole.

4. A liquid crystal display device comprising:

a gate line, a gate electrode, and a gate pad on a first substrate;

a gate insulating layer covering the gate line, gate electrode, and gate pad;

a silicon layer on the gate insulating layer;

a data line, a source electrode, a drain electrode, and a data pad on the silicon layer;

a passivation layer covering the data line, source electrode, drain electrode, and data pad;

a pixel electrode and a data pad electrode on the passivation layer;

a drain contact hole passing through the silicon layer, drain electrode, and passivation layer, wherein the pixel electrode electrically contacts the drain electrode via the drain contact hole;

a data pad contact hole passing through the silicon layer, data pad electrode, and passivation layer, wherein the data pad electrode electrically contacts the data pad via the data pad contact hole;

a gate pad electrode on the gate insulating layer; and a gate pad contact hole passing through the gate insulating layer, wherein the gate pad electrode electrically contacts the gate pad via the gate insulating layer.

5. A liquid crystal display device according to claim 4, further including a second substrate attached to the first substrate, and a liquid crystal layer between the first substrate and the second substrate.

6. A liquid crystal display device according to claim 4, wherein the pixel electrode contacts an inner side surface of the drain electrode via the drain contact hole.

7. A liquid crystal display device according to claim 4, wherein the data pad electrode contacts an inner surface of the data pad via the data pad contact hole.

8. A liquid crystal display device according to claim 4, wherein the pixel electrode is from a group consisting of indium tin oxide (ITO) and indium zinc oxide (IZO).

9. A liquid crystal display device according to claim 4 wherein the data pad electrode is from a group consisting of indium tin oxide (ITO) and indium zinc oxide (IZO).

10. A liquid crystal display device according to claim 4, wherein the gate pad electrode is from a group consisting of indium tin oxide (ITO) and indium zinc oxide (IZO).

11. A liquid crystal display device according to claim 4, wherein the data line includes molybdenum (Mo).

12. A fabricating method for a liquid crystal display device, the method comprising:

forming a first metal layer into a gate line, a gate electrode, and a gate pad on a substrate;

forming a gate insulating layer on the first metal layer;

forming a silicon layer on the gate insulating layer;

forming a second metal layer into a data line, a source electrode, a drain electrode, a data line, and an auxiliary metal pattern on the silicon layer, wherein the auxiliary metal pattern is over the gate pad;

forming a passivation layer on the second metal layer, the passivation layer including first and second through holes, wherein the first and second through holes pass through the drain electrode and data pad, respectively;

etching away the auxiliary metal pattern and portions of the silicon layer and gate insulating layer over the gate pad such that a third through hole is formed through the gate insulating layer; and forming a pixel electrode and a gate pad electrode on the passivation layer, and forming a gate pad electrode on the gate insulating layer such that the pixel electrode and data pad electrode electrically contact, respectively, the drain electrode and data pad, and such that the gate pad electrode electrically contacts the gate pad.

13. The method of claim 12, wherein the pixel electrode is formed in contact with an inner side surface of the drain electrode.

14. The method of claim 12, wherein the data pad electrode is formed in contact with an inner surface of the data pad.

15. The device of claim 12, wherein the pixel electrode is from a group consisting of indium tin oxide (ITO) and indium zinc oxide (IZO).

* * * * *

UNITED STATES PATENT AND TRADEMARK OFFICE
CERTIFICATE OF CORRECTION

PATENT NO.    : 6,654,091 B2
DATED         : November 25, 2003
INVENTOR(S)   : Soon- Sung Yoo et al.

It is certified that error appears in the above-identified patent and that said Letters Patent is hereby corrected as shown below:

Title page,
Item [54], Title, please insert the following data:
-- LIQUID CRYSTAL DISPLAY DEVICE AND ITS FABRICATING METHOD --

Signed and Sealed this

Fourth Day of May, 2004

JON W. DUDAS
*Acting Director of the United States Patent and Trademark Office*